United States Patent Office 3,177,176
Patented Apr. 6, 1965

3,177,176
ADDING SILICA PRIOR TO CONDENSATION OF BORON-POLYSILOXANE
Reginald J. Boot, Niskayuna, and George P. De Zuba, Waterford, N.Y., assignors to General Electric Company, a corporation of New York
No Drawing. Filed Oct. 2, 1961, Ser. No. 142,014
4 Claims. (Cl. 260—37)

The present invention relates to a process for the preparation of plastic, organopolysiloxane compositions exhibiting a high degree of elasticity under suddenly applied stress. More particularly, the present invention relates to an improved process for effecting reaction between certain boron-oxygen-compounds and polymethylsiloxanes resulting in the production of valuable putty-like materials.

Numerous methods are known for the production of plastic materials commonly referred to as "bouncing putty," resulting from the reaction of a poly(dimethylsiloxane) with a boron-oxygen-compound, such as a boron oxide. For example, Wright Patent 2,541,851 shows that an organopolysiloxane composition having desirable plastic properties can be produced by initially forming a mixture comprising a dimethyl silicone oil and pyroboric acid in the presence of ferric chloride, and thereafter heating the mixture to produce a viscous reaction product. The resulting mass is then treated further with additional ingredients such as a filler, and can be further modified with additives such as glycerine, oleic acid and the like.

Although the stepwise method of the prior art for producing bouncing putty by initially forming a viscous reaction product, and then blending it with a filler results in the production of a putty-like composition useful for a variety of applications, the prior art method has a number of marked disadvantages. For example, extended heating periods, such as four hours or more, are often required to form the viscous reaction product of the poly(methylsiloxane) and the boron-oxygen-compound. In addition, even after an extended heating period, experience has shown it is necessary to incorporate a filler into the viscous material, and preferably after it has cooled to room temperature, before a satisfactory putty is obtained. It would be desirable therefore, to be able to make bouncing putty compositions without resort to extended heating periods. In addition, it would also be advantageous to be able to make bouncing putty compositions in a more direct manner, i.e. without having to initially form a viscous reaction product after an extended heating period, followed by the incorporation of a filler therein after the viscous material had cooled to room temperature.

Unexpectedly, it has now been discovered that if a silica filler is uniformly mixed with all of the components utilized in forming the viscous reaction product of the prior art, i.e. a poly(methylsiloxane), a boron-oxygen-compound and ferric chloride, and the mixture is heated to effect reaction between the components of the resulting mixture, a silica-filled organopolysiloxane reaction product is obtained in a relatively short period of time as compared to the stepwise procedure of the prior art. In addition, the resulting putty possesses all of the desirable characteristics of the prior art bouncing putty.

In accordance with the present invention there is provided a process for the production of plastic organopolysiloxane compositions that exhibit a high degree of elasticity under suddenly applied stress comprising (A) forming a uniform mixture of 100 parts of a poly(methylsiloxane) having the formula:

(1) $(CH_3)_aSiO_{\frac{4-a}{2}}$ 1 to 10 parts of a boron-oxygen-compound, 3 to 30 parts of a silica filler, and 0.05 to 2 percent based on the weight of the resulting mixture of ferric chloride (B) heating the mixture of (A) at a temperature between 90° C. to 250° C. until there is a sudden and substantial increase in the viscosity of the mixture (C) allowing the product of (B) to cool to atmospheric temperatures, where $a$ in Formula 1 can vary between 1.85 to 2.1.

Some of the polymethylsiloxanes of Formula 1 and their properties are more particularly shown in Silicones, by Robert N. Meals and Frederick M. Lewis, Reinhold Publishing Corp. (1959), on pages 16–34. For example, included in Formula 1 are poly(dimethylsiloxane) fluids having a viscosity from 50 centipoises or below to as high as 100,000 or higher at 25° C.

The boron-oxygen-compounds that can be employed to produce the putty-like materials of the present invention include for example, boron oxides such as pyroboric acid ($H_2B_4O_7$), boron oxide ($B_2O_3$) etc. In addition, organo borates having the formula:

(2) 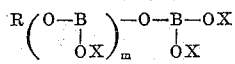

and cyclic borate esters (3) $(ROBO)_y$ can also be employed, where $m$ is a whole number equal to from 0 to 3, $y$ is an integer equal to from 3 to 5, R is an aryl radical, and alkyl radical, and mixtures thereof, and X is a member selected from the class of hydrogen and R.

Radicals included by R of Formulae 2 and 3 are more particularly phenyl, tolyl, naphthyl, etc. and methyl, ethyl, propyl, butyl, etc. radicals. Specific examples of the organo borates of Formula 2 are triphenylborate, trimethylborate, etc. A specific example of a borate ester within the scope of Formula 3 is trimethoxyboroxine.

The silica fillers that have been found to be operable in the present invention are finely divided powders having a particle size in the range of .01 to 50 microns. These fillers can be made by precipitation or aerosol-aerogel methods, by vapor phase burning of silicon tetrachloride or ethyl silicate, or by such means as mechanical attrition of quartz. According to the method of manufacture, the silica fillers can contain hydroxyl radicals or alkoxy radicals bound to silicon-atoms. Examples of such silica fillers are described in U.S. Patents 2,541,137, 2,610,167 and 2,657,149.

In the practice of the invention, a uniform mixture is formed composed of a poly(methylsiloxane), a boron-oxygen-compound, a silica filler, and a ferric chloride catalyst in anhydrous form or as a hexahydrate. The mixture is heated while being agitated until there is a sudden and substantial rise in its viscosity. The resulting product is then allowed to cool to room temperatures.

In forming the mixture, the order in which the various ingredients are added together is not critical. A preferred procedure however, is to add the boron-oxygen-compound to a mixture of the poly(dimethylsiloxane) and silica filler followed by the ferric chloride catalyst.

Although the temperature employed to effect the reaction between the various ingredients of the mixture can vary widely, experience has shown that it is desirable to heat the mixture to a temperature of at least 90° C. before adding the ferric chloride. After the reaction has been initiated, the temperature of the mixture will rise due to the formation of exothermic heat. External heat can advantageously be utilized however, until a temperature of at least 150° C. to as high as 200° C. or higher is attained.

In order to provide for a maximum degree of dispersion of the various ingredients used in the mixture during the reaction, and for uniformity in the final product, it has been found desirable to uniformly agitate the mixture during the course of the reaction. A conventional means such as a doughmixer, or stirrer, can be employed for effective results. Reaction times moreover, can vary widely, depending upon such factors as degree of agitation, amount and type of silica filler utilized, amount of catalyst, etc. depending in turn upon the application to which the final product is to be employed. Generally the reaction will be completed after one hour or less, although two hours or more under particular circumstances will not be unusual.

The completion of the reaction can be readily determined by a sudden and rapid rise in the viscosity of the mixture. A substantial change in the viscosity of the mixture can be readily determined visually by a skilled operator. In particular situations moreover, particularly when the filler loading is high, i.e., where there is utilized at least about 15 parts of filler per 100 parts of poly(methylsiloxane) in the mixture, the change in viscosity can be so marked that further agitation of the mixture by a standard agitating means such as a doughmixer will result in substantially increased power requirements to rotate the doughmixer blades. Experience has shown moreover, that if a minor amount of filler is utilized, a final reaction mixture viscosity even as little as 50,000 centipoises at a shear rate of 1 sec.$^{-1}$, will still provide for a desirable bouncing putty upon allowing the mixture to cool to atmospheric temperature, i.e. 20° to 30° C. without any added filler.

At the termination of the reaction, the product can be modified further by the addition of various ingredients such as softeners, etc. For example, softening agents such as oleic acid, ferric stearate, etc. can be employed, if desired.

In order that those skilled in the art will be better able to practice the invention, the following examples are given by way of illustration and not by way of limitation. All parts are by weight.

*Example 1*

Into a doughmixer, there was added a mixture of 584 parts of a poly(methylsiloxane) fluid consisting of 93 mol percent of dimethylsiloxane units and 7 mol percent of monomethylsiloxane units and 120 parts of a precipitated silica filler containing 3 to 9 percent by weight of water, and having a pH of between 4 to 5. The viscosity of the mixture was about 50,000 centipoises at 26.5° C. as measured on a Brookfield Viscometer at 10 r.p.m. It was heated to about 100° C. and 32 parts of boron oxide was added. The mixture was then heated to about 106° C. when 1.6 parts of anhydrous ferric chloride was added. The mixture was further heated for a period of about one hour when it suddenly thickened. The change in the viscosity of the mixture was easily ascertained since the blades of the doughmixer sounded like they were working harder indicating an increase in power requirements. At this point, the temperature had reached about 195° C. Twenty-four parts of ferric stearate were then added to soften the reaction product. While the batch cooled, 16 parts of titanium dioxide pigment and 3.2 parts of red iron oxide were added to color the putty. In addition, when the temperature had fallen below 70° C., 12½ parts of glycerine were added to the putty.

The procedure of Example 1 is repeated except that the precipitated silica filler is not present in the mixture of the poly(methylsiloxane) boron-oxide and ferric chloride when it is heated. After the mixture is heated for about three hours at a temperature in the range between 150° C. to 200° C., the mixture is found to gradually thicken to a desirable consistency. Equivalent parts of the precipitated silica filler used in Example 1 is added to the viscous product after ferric stearate, titanium oxide and iron oxide, as in Example 1 are added, and the mixture is blended in a doughmixer.

Twelve parts of the putty prepared in Example 1 above was rolled into a ball and dropped from a height of about 50 inches onto the surface of a ½ inch thick steel plate. The rebound was found to be about 76%. The flow characteristics of the putty prepared in Example 1, were measurable on a Scott Model P-1 plastometer. A weight equivalent to a 5 lb. load was put on a 5 gram sample of the putty in the form of a ball and the thickness in mil of the putty was measured after 60 seconds. It was found to be 128. The properties of the filled putty that is prepared by incorporating the precipitated silica filler in the product formed by heating the poly(methylsiloxane) and boron-oxide for three hours is found to be substantially the same as the putty of Example 1.

Based on the above results, one skilled in the art would know that the process of the present invention provides for an improved method for producing bouncing putty compositions over that of the prior art. For example, bouncing putty compositions having a rebound of 76% and the above-described flow characteristics would be highly satisfactory in a variety of bouncing putty applications. Included among the applications that the bouncing putty materials of the present invention are suitable for are filling compounds, high temperature seals for vacuum joints, typewriter type cleaners, therapeutic uses, etc.

While the foregoing example has been limited to only a few of the very many variables within the scope of the present invention, it should be understood that the present invention is directed to the production of a much broader class of organopolysiloxane compositions that exhibit a high degree of elasticity under suddenly applied stress by mixing together a polymethylsiloxane of formula (1), a boron-oxygen-compound, a silica filler, and ferric chloride in accordance with the practice of the present invention.

What we claim as new and desire to secure by Letters Patent of the United States is:

1. A process for making plastic organopolysiloxane compositions that exhibit a high degree of elasticity under suddenly applied stress comprising (1) forming a mixture by uniformly dispersing together by weight 100 parts of a poly(methylsiloxane), having the formula

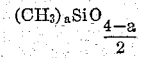

1 to 10 parts of a boron-oxygen-compound selected from the class consisting of a boron oxide, and a borate ester, 3 to 30 parts of a silica filler, and 0.05 to 2 percent based on the weight of the resulting mixture of ferric chloride, (2) heating the mixture of (1) at a temperature between 90° to 250° C. until there is a sudden and substantial increase in the viscosity of the mixture, (3) allowing the product of (2) to cool to atmospheric temperatures, where $a$ can vary from 1.85 to 2.1.

2. The process in accordance with claim 1 where the boron-oxygen-compound is a boron oxide.

3. The process in accordance with claim 1 where the mixture is heated to a temperature of at least 150° C.

4. The process in accordance with claim 1 where the silica filler is a precipitated silica filler.

References Cited by the Examiner

UNITED STATES PATENTS 2,541,851  2/51  Wright.
2,568,672  9/51  Warrick.
2,644,805  7/53  Martin.

FOREIGN PATENTS 662,735  5/63  Canada.
1,032,530  6/58  Germany.

MORRIS LIEBMAN, *Primary Examiner.*
ALPHONSO D. SULLIVAN, *Examiner.*